Feb. 17, 1970             A. SPENCE             3,496,071
PROCESS FOR THE SEPARATION OF ORGANIC MATERIALS BY
CONTINUOUS HORIZONTAL EVAPORATION AND
HORIZONTAL CONDENSATION
Original Filed Dec. 26, 1962             4 Sheets-Sheet 2
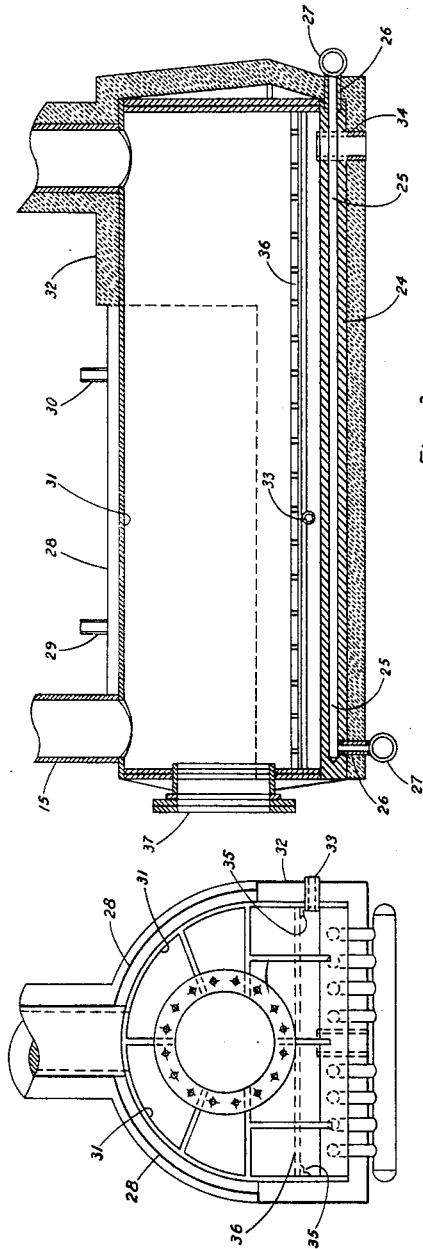
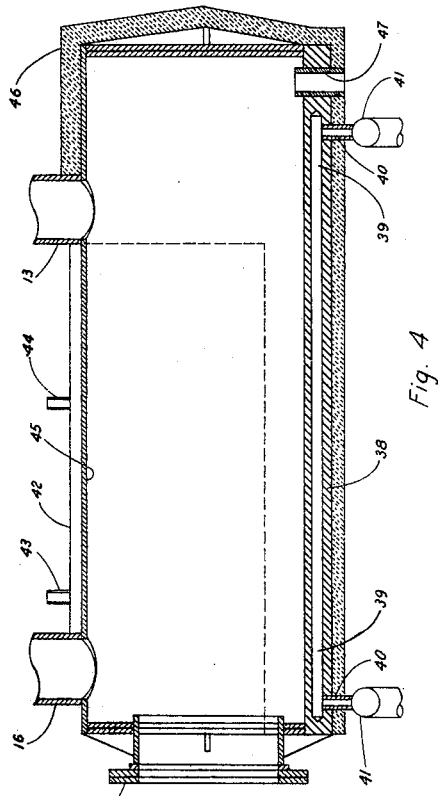
INVENTOR.
Andrew Spence Feb. 17, 1970            A. SPENCE            3,496,071

PROCESS FOR THE SEPARATION OF ORGANIC MATERIALS BY
CONTINUOUS HORIZONTAL EVAPORATION AND
HORIZONTAL CONDENSATION

Original Filed Dec. 26, 1962            4 Sheets-Sheet 3

INVENTOR.
ANDREW SPENCE
BY
*Greer Marichal, Jr.*
ATTORNEY

United States Patent Office 3,496,071
Patented Feb. 17, 1970

3,496,071
PROCESS FOR THE SEPARATION OF OR-
GANIC MATERIALS BY CONTINUOUS
HORIZONTAL EVAPORATION AND
HORIZONTAL CONDENSATION
Andrew Spence, Crosby, Tex., assignor to Spence and
Green Chemical Company, Crosby, Tex., a corporation
of Texas
Continuation of application Ser. No. 248,830, Dec. 26,
1962, which is a continuation-in-part of application Ser.
No. 116,234, May 25, 1961, which in turn is a continua-
tion of application Ser. No. 699,141, Nov. 26, 1957.
This application Mar. 27, 1967, Ser. No. 633,338
Int. Cl. B01d 3/42, 3/10
U.S. Cl. 203—72
13 Claims

ABSTRACT OF THE DISCLOSURE

Methods and apparatus are provided for the continuous fractional distillation and separation of liquid organic materials having closely related boiling ranges (for example, separating rosins and fatty acids from tall oil) by continuous differential evaporation from liquid flowing along an extended and unobstructed horizontal evaporation zone with a countercurrent flow of vapors and continuous differential condensation thereof along a horizontal condensation zone extending above and substantially parallel to the evaporation zone. Because of the parallel orientation of condensation and evaporation zones, vapors which are condensed in the condensation zone drop back into the liquid mixture in the evaporation zone at a point upstream of the point from which they were originally vaporized. As a further feature of this invention, a plurality of vapor fractions may be withdrawn at various points along the vapor flow and accumulated and returned to the apparatus at different spaced points therealong for further refining and rectifying the various materials originally present in the starting liquid mixture.

---

This application is a continuation of co-pending application Ser. No. 248,830, filed Dec. 26, 1962, which is a continuation-in-part of Ser. No. 116,234, filed May 25, 1961, and now abandoned, which application was a continuation of prior application Ser. No. 699,141, filed Nov. 26, 1957, now abandoned.

This invention relates to an improved process and apparatus for high vacuum distillation and rectification of high boiling point materials and heat sensitive materials, and particularly to a process and apparatus for the fractional distillation of such materials in such a manner as to preclude any significant thermal decomposition, polymerization, or other significant heat damage to the resulting distillates or residues; and to an apparatus for vapor phase reaction of fatty acids in the formation of esters and nitriles and the separation of unreacted materials from the reaction products.

In one of its aspects this invention relates to an improved process and apparatus for producing from crude tall oil, a rosin substantially free from fatty acid and unsaponifiable compounds, and fatty acids substantially free from rosin and unsaponifiable compounds. It also relates to an improved process and apparatus for producing from crude cottonseed fatty acid, a palmitic acid fraction substantially devoid of olefinic fatty acids and unsaponifiable materials, and an olefinic fatty acid fraction substantially devoid of palmitic acid and unsaponifiable materials. It also relates to an apparatus particularly adapted for use under high vacuum for rectification of fatty acid-containing materials to produce fatty acids substantially free from unsaponifiable materials and a substantially unpolymerized residue fraction.

In order to better appreciate the usefulness and advantages of the process and apparatus to which this invention relates, there follows a discussion of techniques for producing rosin and fatty acids from crude tall oil, and the advantages of this invention over prior methods. This discussion is illustrative and one skilled in the art will readily see that the same advantages will apply to the rectification of other fatty acid-containing materials, and the fractional distillation of other heat-sensitive materials and high boiling point materials.

Tall oil is a crude material and as such it is of limited use and of marginal value. Depending on its source, it contains 35% to 65% rosin acids, 25% to 60% fatty acids, and 5% to 30% unsaponifiable compounds. By a process of acid refining a portion of the unsaponifiables can be removed and the color and odor of the remaining fraction is greatly improved resulting in a more valuable product generally marketed as refined tall oil. However, in recent years the chief industrial interest in tall oil has been its value as a raw material for the production of rosin and fatty acids. The almost universal commercial practice for separating tall oil into its individual components is by fractional distillation. Because the material is sensitive to heat it must be distilled at temperatures far below that of its boiling point at atmospheric pressure. Therefore, reduced pressure distillation is the universal commercial practice. However, since the boiling points of the individual components are close together, high multiplate (or equivalent) conventional rectification columns are required to effect the separation. Such columns in operation have a high pressure drop from bottom to top, equivalent to 40 mm. or 50 mm. of mercury, so that even if a very high vacuum is maintained at the top of the column (say an absolute pressure of 1 mm. of mercury), the pressure at the bottom and in the still pot or reboiler will be 40 mm. or 50 mm. of mercury. In order to avoid a resulting boiling point rise, the usual universal practice is to feed steam into the pot, which effects the necessary lowering of the boiling points of tall oil components by means of the law of Partial Pressures, as it continues to feed from 0.4 to 2 pounds of steam for each pound of tall oil feed. This addition of steam adds greatly to the cost of the apparatus and the expense of its operation. For example, the heat required to evaporate one pound of fatty acid is approximately 120 B.t.u., whereas the evaporation of water requires approximately 1000 B.t.u. per pound. Thus the addition of steam increases the heat requirements for distillation 3 to 15 fold. Furthermore, the injected steam must be handled by the vacuum generating system, thus greatly increasing its size and operating expenses. With regard to the size and cost of the distillation apparatus, the controlling factor is the volume of distillation vapors rather than weight, the greater the volume, the greater the size required. The volume of a pound of steam is approximately 15 times that of a pound of fatty acid or rosin vapor, at any given pressure. Thus it is seen that the addition of steam adds greatly to the vapor volume, and consequently to the size and cost of the apparatus. Furthermore, as the size and complexity of a system under vacuum is increased, it becomes increasingly difficult to build and maintain such a system. Thus it is readily seen that an anhydrous rectification process has great potential advantages. However in the past attempts at vacuum rectification of tall oil in the anhydrous state have not been very successful or commercially attractive. Because of the difficulty of separating the components, conventional rectification columns of such height are required, that pressure drop through the column precludes maintaining sufficient vacuum throughout the system to effect the necessary boiling point lowering. In the past attempts to circumvent this difficulty has led to apparatus of great complexity and tremendous investment cost, difficult to operate. Therefore a simple, compact apparatus, relatively cheap to build, flexible of operation and easy to maintain and yet capable of fractionally distilling tall oil in the anhydrous state so as to achieve a substantially complete separation of the fatty acids, rosin acids, and unsaponifiables from each other, would be of great benefit to the industry and highly desirable to possess.

Such is one general object of this invention; namely, to provide a simple process and a relatively inexpensive, compact apparatus, flexible and simple of operation and easy to maintain; such apparatus having a very low pressured drop between any two points within the apparatus, so that the maximum pressure in any area subjected to elevated temperatures can be maintained in the order of 5 mm. or less of mercury, equivalent; such apparatus also having sufficient heat exchange surfaces arranged in such a manner as to provide sufficient successive or alternating evaporation and condensation so as to make possible the process herein described, by means of which one can achieve the degree of fractionation and rectification necessary for any desired degree of separation of two closely boiling fractions, such as the rosin acid component and fatty acid component of tall oil.

Another object of this invention is to provide a continuous pot still in which, when a binary or polynary mixture is being distilled, the liquid in the pot never reaches a uniform equilibrium composition as in ordinary or conventional pot stills. In the case of this invention the pot is an elongate substantially horizontal vessel in which there is little or no intermixing of the pot liquor longitudinally in the vessel. That is to say, during operation of the apparatus, the composition of the pot liquor will vary from one end of the horizontal elongated vessel to the other due to the differential distillation which occurs as the residual liquor flows from point of entry to the point of discharge. The composition of the residual liquor at any point is a function of the increment of the liquor that is evaporated per unit length of the horizontal elongate distillation vessel, and can be determined from the Isobaric Liquid-Vapor composition curves which may be derived from Raoult's Law. Thus by design and operation, the composition of the residual liquid at point of discharge from the vessel can be made to vary over a wide range, independently of the composite composition of the distillate vapors, and independently of the ratio of the quantity of distillate to quantity of residue withdrawn; whereas heretofore in continuous distillation apparatus and processes, all of the liquid in the pot or reboiler unavoidably reaches a uniform constant composition under equilibrium conditions and is essentially in equilibrium with the vapor leaving the surface and consequently the residue withdrawn is of the same composition as that of the pot and its composition bears a direct relationship to that of the distillate vapors, in accordance with Raoult's Law.

Another object of this invention is to provide a continuous pot still consisting of an elongated substantially horizontal heat exchanger and vapor space enclosed by elongated shell attached to the horizontal heat exchanger, the shell providing condenser surface for the vapors rising from the elongated horizontal heat exchanger. During operation of the apparatus the composition of the vapors will vary from one end of the horizontal elongated vessel to the other, continuous differential condensation is provided as the vapors are partially condensed and the condensed portion returns to the flat plate heat exchanger for further differential evaporation, thus achieving the desired degree of rectification by continuous repetition of evaporation and condensing.

Another object of this invention is to provide an apparatus in which rectification is accomplished by simultaneous continuous differential distillation and differential condensation without packing or bubble caps in the vapor space thus providing for the separation of the component volatile compounds to the desired degree of purity with very little pressure differential within the apparatus.

Another object of this invention is to provide an apparatus in which the higher boiling component is finally purified to the desired purity in an elongated flat plate differential evaporator condenser, the high boiling component withdrawn as a liquid and the purity of the high boiling component being varied as desired since the discharged liquid is never in equilibrium with the composite vapors, therefore its composition being independent of the vapors above it and the quantity of liquid to quantity of vapors, making possible a higher purity of the high boiling component than heretofore obtained.

Another object of this invention is to provide a substantially horizontal flat plate continuous differential evaporator with the upper surfaces providing continuous differential condensation, with vapor take off for the rectified low boiling vapor fraction and rectified high boiling vapor fraction and residue discharge for the nonvolatile residue.

Another object of this invention is to provide an elongated horizontal flat plate continuous differential evaporator and differential condenser which may be used with one or more short packed columns, bubble cap columns or falling film condensers; the pressure drop across the apparatus being such that the boiling temperature is below the decomposition temperature of the compound.

Another object of this invention is to provide the apparatus with two zones, one zone effecting separation of the fractions by rectification, the other zone completing the separation by simple or differential distillation. Zone one to be a short rectification zone preferably of the packed type so as to provide a minimum pressure drop thereacross. Zone two to be a flat plate heat exchanger on which the material passes as a film and is purified by simple distillation, differential distillation. Zone one and zone two are inter-related, that is to say that design of zone two is predicated by degree of rectification resulting in zone one.

Another object of this invention is to provide an apparatus which is a continuous pot still having for its upper section a rectification tower, preferably of the packed type, for rectification of the lower boiling fraction to a desired degree of purity, and for its lower section or pot a horizontal flat plate heat exchanger, which by differential distillation of a film of the higher boiling fraction, discharged from the upper section, purifies the higher boiling fraction to the degree of purity desired.

Another object of this invention is to provide an apparatus which is a multiple number of continuous pot stills. The number of stills being a function of the desired purity of the lower boiling fraction and the desired pressure to be maintained in the pot or horizontal sections of the apparatus.

Another object of this invention is to provide an apparatus in which the feed material to be fractionated is first stripped of the desired volatile components on a flat plate horizontal heat exchanger under high vacuum, with a very short residence time for the residue fraction in the heat exchanger, in the order of 3 minutes, so that a minimum polymerization or thermal damage of the residue fraction occurs.

Another object of this invention is to produce a residue fraction suitable to use with solvents as a defoamer, e.g., as defoamer for the acidulation of phosphate rock.

Another object of this invention is to strip the crude tall oil more free of its fatty acids and rosin acids than has heretofore been the practice and to produce a residue material substantially free of rosin, fatty acids and polymerized materials, so that further separation of the residue into valuable compounds is not complicated by presence of substantial quantities of fatty acids, rosin and polymerized materials.

Another object of this invention is to provide an apparatus which after stripping the crude tall oil of rosin, fatty acids and some unsaponifiables as vapors, the said vapors are passed into a rectification zone where the lower boiling color and odorous unsaponifiables are removed overhead and the reflux is passed through a rectification zone onto a horizontal flat plate heat exchanger where it is differentially distilled and a small rosin color fraction removed. The main body of product condensed just below the lower boiling color fraction.

Another object of this invention is to provide an apparatus in which the lower boiling color and odorous fraction and higher boiling color fraction and residue of crude tall oil are removed before the fatty acid rosin mixture is passed to the final rectification and differential distillation sections for separation to fatty acids, of a desired degree of purity and to rosin acids of a desired degree of purity and to a desired degree of lightness in color. For example, it is customary in commercial operations to redistill the fatty fraction to give product of superior lightness in color and high acid number which is a measure of its purity; the redistillation of the rosin to remove color fraction and increase its purity not being a rational process. The apparatus and process of this invention remove the low boiling color and odor fractions, and high boiling color fractions from the main body of vapors before condensing the mixture. The evaporation of the condensed mixture of rosin and fatty acid, and rectification and differential distillation results in a rosin product of higher purity and lighter color. It is both feasible and profitable with the apparatus of this invention to produce a rosin product single, double, triple, etc., distilled with the end rosin product being substantially free of unsaponfiables and of color lighter than commercially classified in the trade.

Another object of this invention is to provide a distillation apparatus where the condenser provides separation by partial condensation and at the same time provides reflux to the horizontal differential evaporator-differential condenser to maintain the desired film thickness and desired composition of the film of the pot.

Another object of this invention is to provide an apparatus consisting of an elongated horizontal evaporator with the upper surfaces providing continuous differential condensation wherein the differential condensation rate is varied so that as the vapors pass counter-currently upstream of the feed there is less and less condensation thus providing the desired amount of vapor take off with desired purity.

Another object of this invention is to provide an apparatus consisting of an elongated horizontal exaporator with the upper surfaces providing continuous differential condensation, wherein the heating medium is a liquid such as Dowtherm and the heating liquid flows countercurrent to the film in the evaporator resulting in the heating liquid providing a differential heating of the film of the pot.

Another object of this invention is to provide an apparatus in which distillation methods of (1) partial condensation, (2) rectification, (3) differential distillation are combined to best advantage to give a compact apparatus, simple of construction and economical to build and yet of adequate rectification capacity to make a separation between two closely boiling fractions; an apparatus so designed that the pressure drop across it is such that the boiling point of the material to be fractionated is lower than its decomposition temperature at the greatest pressure within the apparatus.

Another object of this invention is to provide an apparatus in which the hold up time on all heat exchange surfaces is a matter of 1 to 3 minutes rather than 15 to 60 minutes and evaporation is from films flowing across flat heat exchange surfaces.

Another object of this invention is to provide a process for the pre-treatment of crude tall oil by first vacuum drying, de-aerating and avaporating a small color and odor fraction, then bleaching and filtering to remove substantially all solids and more of the color odor fraction, and corrosive fraction; and to provide an apparatus for stripping the pre-treated tall oil, substantially free of rosin and fatty acids from a film of tall oil flowing across a flat plate heat exchanger, thereby producing a distilled tall oil of high purity and light color, and purified residue material more suitable for separation into its components than heretofore produced, and a residue much lighter in color than heretofore produced.

Another object of this invention is to provide an apparatus for the vapor phase anhydrous reaction of fatty acids and rosin, with aliphatic monohydric alcohols and polyhydric alcohols to form esters and the simultaneous fractionation of the esters and removal of the reaction product water and stepwise esterification with stepwise removal of products of esterification (water) to insure completion of reaction.

Another object of this invention is to provide an apparatus for the vapor phase disproportionation of rosin with iodine and simultaneous fractionation of the resin from crude tall oil.

Another object of this invention is to provide an apparatus for the vapor phase stabilization of the fatty acids with iodine, against color reversion.

Another object of this invention is to provide an apparatus for vapor phase, anhydrous reactions, of fatty acids and rosin with ammonia.

Another object of this invention is to provide a process and apparatus which operates under anhydrous conditions and at lower temperature than heretofore commercial apparatus, thus reducing the corrosion resulting from moisture at high temperature in the presence of acidic materials.

Another object of this invention is to provide a process and apparatus in which the need for injection of superheated steam is not necessary thereby eliminating the erosion effect.

Another object of this invention is to provide arrangements of apparatus and techniques for separating various components of starting materials of the character described into a substantial plurality of different multicomponent fractions, with each of such fractions individually withdrawn at a different particular point or position in the apparatus or processing where the concentration of a selected component is maximized in that particular multicomponent fraction.

Another object of this invention is to provide arrangements of apparatus and techniques for separating various components of starting materials of the character described into a substantial plurality of different multi-component fractions in a plurality of individual units for differential evaporation and condensation, at least portion of said individual units being substantially identical for the modular arrangement and interrelation thereof with regard to both liquid and vapor flow through said arrangements of apparatus.

Another object of this invention is to provide arrangements of apparatus and techniques for separating starting materials of the character described into a plurality of different multi-component fractions in one processing stage, each fraction having a different concentration of a particular selected component therein, and then reintroducing such fractions individually into a second processing stage for further rectification and separation of individual components in such multi-component fractions.

Another object of this invention is to provide arrangements of apparatus and techniques for separating starting materials of the character described into a plurality of different multi-component fractions in one stage of the processing, and then reintroducing at least some of such fractions into a subsequent processing stage for rectification and separation of components thereof, with such fractions being introduced into the subsequent processing stage at different points therein according to the particular concentration of component in the individual multi-component fractions.

The above enumerated objects and other objects and advantages of this invention will become more apparent to one skilled in the art upon consideration of the following descriptions, attached drawings and appended claims.

In order that the process and apparatus of this invention may be better comprehended, the apparatus of the preferred embodiment will first be illustrated and described in some detail and then the process steps will be described with respect to the specific apparatus described, although it will be understood that the process can be carried out in apparatus other than that specifically described and illustrated. Now then, reference is made to the attached drawings wherein:

FIG. 2 is an end view of the differential evaporator-condenser 10 shown in FIG. 1;

FIG. 3 is a side view in cross-section of the differential evaporator-condenser 10 shown in FIG. 1;

FIG. 4 is a side view in cross-section of the differential evaporator-condenser 11 shown in FIG. 1;

Figure 1:
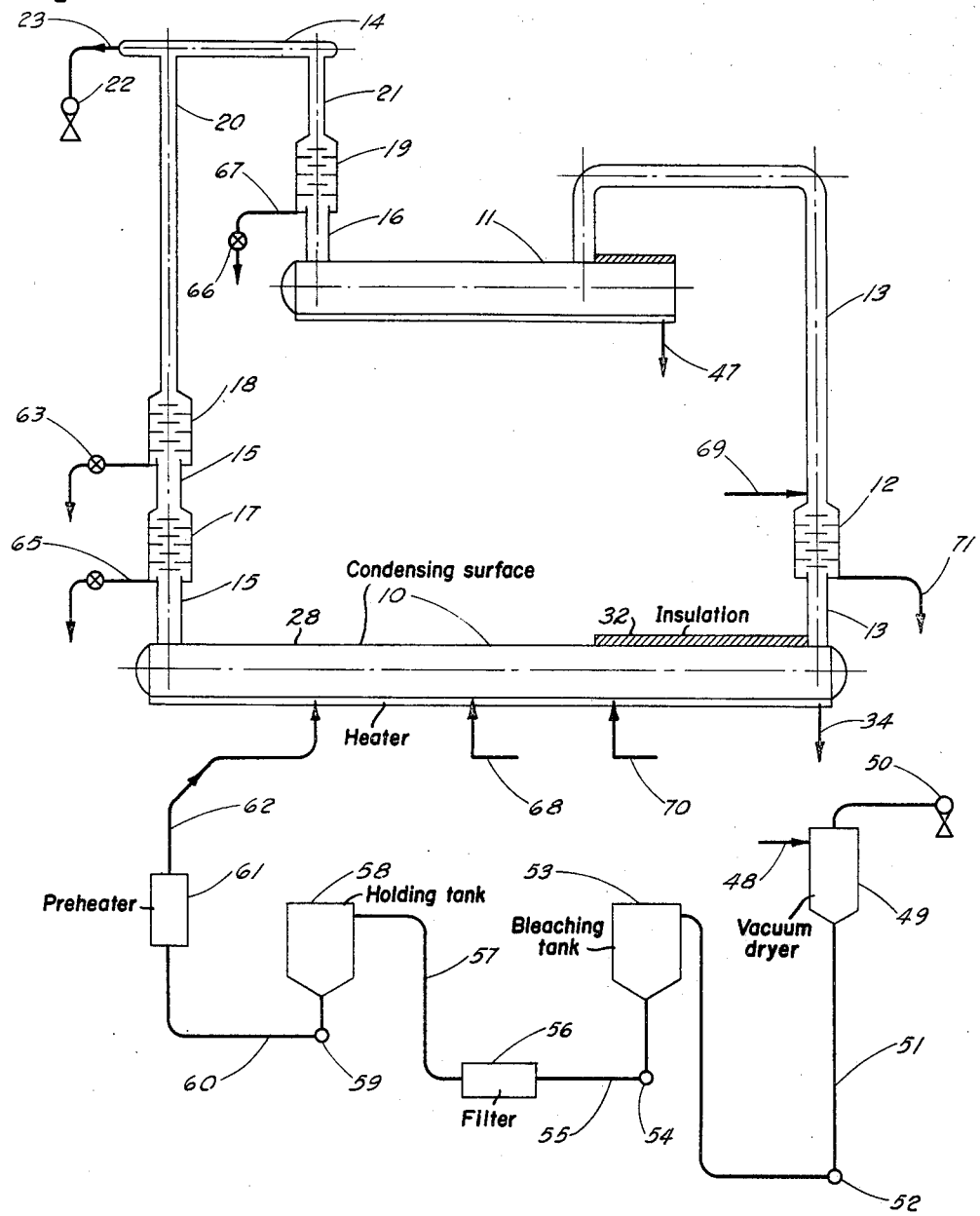
FIG. 1 is the schematic representation of the preferred embodiment of the apparatus of this invention. It also represents how the process of this invention can be carried out.
Figure 6:
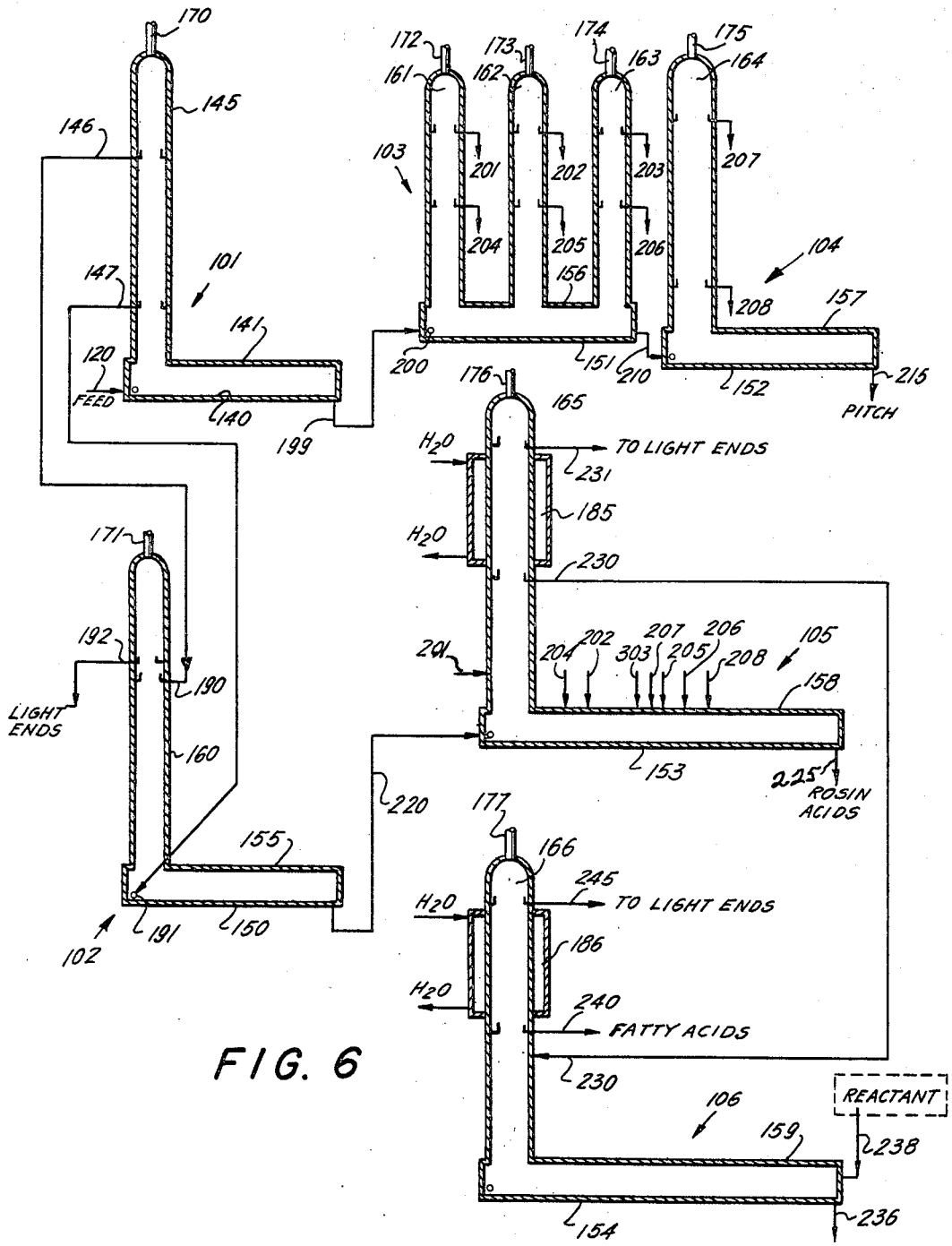

FIG. 5 is a diagrammatic or schematic flow sheet representation indicating an apparatus and processing arrangement embodying and for practicing this invention in the treatment of tall oil for the separation thereof into a plurality of rosin, fatty acid, and other intermediate or combined or rectified component fractions; and FIG. 6 is a somewhat diagrammatic illustration, similar to FIG. 1, of an arrangement of apparatus and rectification components embodying and for practicing this invention such as for use in a processing arrangement as indicated in FIG. 5.

Like reference characters are used throughout the various drawings to designate like parts.

Referring to FIG. 1, there are illustrated two differential evaporator-condensers 10 and 11 connected to each other through condenser 12 and vapor line 13 and connected to a common vacuum header 14 through vapor lines 15 and 16 and condensers 17, 18 and 19, and non-condensible vapor lines 20 and 21. A vacuum can be applied to vacuum header 14 by any suitable evacuating means 22, such as a vacuum pump acting via line 23.

Referring now to FIG. 2 and FIG. 3 for more details, it will be noted that the differential evaporator-condenser 10 is an elongate horizontal vessel, the bottom of which is a long, flat rectangular heating platen 24 containing a plurality of parallel hollow channels 25 running longitudinally through the platen to pipes 26 at each end and thence to headers 27 for circulation of a heating medium of any desired temperature through the platen. The walls and top of the differential evaporator-condenser 10 are formed of sheet metal shell, a portion of which is enclosed in a jacket 28 with inlet 29 and outlet 30 by means of which a coolant of any desired temperature can be circulated through the jacket, thus converting that portion of the shell which is jacketed to a condensing surface 31. The length and area of this condensing surface is a matter of design. In this embodiment it extends from the extreme upstream end for about ⅔ of the length of the vessel, the area of the condensing surface varying increasingly from the upstream end to the downstream end. The remaining exterior surfaces are insulated 32 to prevent condensation and heat losses. A feed inlet 33 is provided to enable introduction of feed material directly onto the heating platen at a point located about ⅓ (more or less) of the distance from vapor outlet 15 to the downstream end of the condensing surface. An outlet 34 for non-vaporized material is provided at the extreme opposite end downstream from the feed entry. The top of the outlet pipe extends into the vessel approximately one millimeter above the top level of the heating platen. Longitudinal brackets 35 are provided a short distance above the platen to hold an entrainment separator 36 which may or may not be required depending on the nature of the feed stock. A removable bulkhead 37 is provided in the end for inspection or cleaning of the vessel.

Referring now to FIG. 4 for additional details, it will be noted that differential evaporator-condenser 11 is an elongate horizontal vessel, the bottom of which is a long, flat rectangular heating platen 38 containing a pluraltiy of parallel hollow channels 39 running longitudinally through the paten to pipes 40 at each end and thence to headers 41 for circulation of heating medium of any desired temperature through the platen. The walls and top of the differential evaporator 11 are formed of a sheet metal shell, a portion of which is enclosed in a jacket 42 with inlet 43 and outlet 44 by means of which coolant of any desired temperature can be circulated through the jacket, thus converting that portion of the shell which is jacketed to a condensing surface 45. This condensing surface extends from the upstream end of the vessel, to a point about ¾ down the length of the vessel. The remaining exterior surfaces of the vessel are insulated 46. Vapor inlet pipe 13 enters the vessel through the top at a distance of about ⅓ the length of the vessel, from the downstream end. An outlet 47 for now-vaporized material is provided at the extreme downstream end opposite of vapor outlet pipe 16. The top of the outlet 47 extends approximately one millimeter above the top level of the heating platen.

Condensers 12, 17, 18 and 19 can be of any conventional construction so long as each is sized and designed to preclude any significant pressure drop thereacross.

A description of the process to which this invention relates together with and in conjunction with a description of the operation of the above described embodiment of the apparatus follows. The material to be processed, such as crude tall oil, is fed via pipe 48 to a vacuum drier 49 which can be of conventional construction and have a high vacuum maintained thereon by means of an evacuating system 50. In drier 49 substantially all of the water and much of the non-condensibles are removed. The resultant dried and de-aerated crude flows through pipe 51 and pump 52 to bleaching tank 53 which can be of conventional construction and have suitable means for heating and agitation. Here the crude is treated with a suitable bleaching agent. The bleached crude is then passed by pump 54 through pipe 55 and through filter 56, which can be of conventional construction, and then through line 57 to feed holding tank 58. The crude tall oil is then fed by pump 59 through pipe 60 to feed preheater 61.

In this preheater the crude can be heated to any desired temperature but for tall oil processing it is preferred to heat it to a temperature somewhat below the temperature maintained in the differential evaporator-condenser 10. From the preheater the feed is conducted through pipe 62 at a predetermined rate into the differential evaporator-condenser 10 and discharged onto the heating platen. The exact point of discharge is a matter of design and depends on the type feed material and the degree of separation of the components desired. In the case of crude tall where maximum separation is desired, the optimum point of entry in the illustrated embodiment has been found to be a distance of about ⅓ L downstream from the upstream end (where "L" is the total length of the vessel). Once on the heating platen the feed spreads into a film approximately one millimeter thick, as determined by the height of the liquid outlet tube 34, and commences to flow downstream towards the outlet.

Because the feed is near the vaporization temperature on entry vaporization begins almost immediately and continues at a uniform rate as the film proceeds downstream. By design, the feed rate and platen temperature are controlled so as to accomplish evaporation of only a small increment of the feed for each unit of length of platen over which it passes. The length and total area of the platen are of such design to achieve the total desired evaporation. Thus it is seen, at each successive point downstream the distillate vapors and liquid stream become progressively richer in high boiling components as a result of differential distillations at the proceeding points; and conversely at each successive point upstream, the distillate vapors and liquid stream become progressively leaner in high boiling components.

The condensing surface provided on the upstream part of the differential evaporator-condenser acts to further enhance this concentration of components in the following manner: vapor formed in this area tends to flow upstream toward the upstream vapor outlet 15, and striking the condenser surface it is differentially condensed on its journey, the condensate falling back to the platen, upstream from the point of original evaporation, and the procedure is repeated again. The area and temperature of the condenser can be controlled to achieve the desired rate of condensation which in any case must be less than the evaporation capacity of the platen. In the case illustrated, the condensing rate is best maintained at about ½ of the evaporation rate at the downstream end of the condenser and varying gradually to about 1/10 of the evaporation rate near the upstream end of the condenser. Under such conditions substantially all of the vapors formed on the platen under the condenser will flow toward the upstream low-boiling vapor outlet 15 and the vapors formed under the insulated portion will flow to the downstream high boiling vapor outlet 13.

With these simultaneous complementary processes of differential evaporation and differential condensation a high degree of separation of the components of the feed is obtained. For example in processing an average crude tall oil containing 42% rosin, under the conditions and process steps described above, approximately 40% of the weight of the feed will pass into vapor line 15 as fatty acid containing no more than 1% to 2% rosin; somewhat over 40% will pass into vapor line 13 as rosin vapor containing about 15% fatty acids; while less than 20% will pass out the liquid outlet 34 as pitch substantially devoid of fatty acids or thermal decomposition products. The fatty acid vapors entering condenser 17 are condensed except for a small fraction containing most of the color and odor bodies which, being lower boiling, are allowed to pass into condenser 18 where they are condensed, the temperatures of the two condensers being adjusted to achieve the desired ratio of condensation in each. The condensates are withdrawn through pipes 63 and 65.

If it is desired, say when processing a crude of higher rosin content, the take-off valve in condenser outlet pipe 65 can be adjusted to cause a portion of the condensate of condenser 17 to be returned to the differential evaporator-condenser 10, thus improving the separation through additional differential evaporation-condensation effects and providing the desired amount of liquid to maintain the upstream film of desired thickness and composition. The vapors containing approximately 85% rosin passing out vapor outlet 13 flow into condenser 12 which is operated at a controlled temperature so as to achieve partial condensation of 10% to 20% of the vapors entering, the condensate being of about 95% rosin content which is withdrawn. It has been found that the color bodies in rosin can be concentrated and removed in this manner in the higher boiling component. The vapors passing through condenser 12 are conducted through vapor pipe 13 into the top of differential evaporator-condenser 11, wherein they flow toward vapor outlet 16, passing along condensing surface 45 and are differentially condensed thereon.

The condensate falls to the heating platen and flows toward liquid outlet 47 and the processes of repeated simultaneous differential evaporation and differential condensation proceeds as previously described. All vapors enter vapor outlet 16 and pass into condenser 19 where they are condensed and the condensate is withdrawn through line 67, valve 66 being adjusted so as to return a portion of the condensate, through vapor line 16, to the differential evaporator-condenser to enhance the separation and maintain the film. The liquid film on the platen thus becomes increasingly rich in the high boiling component (rosin) and is withdrawn through liquid outlet 47. By the process thus described about 80% of the vapors entering differential evaporator-condenser 11 are withdrawn as liquid through liquid outlet 47 and it contains about 97% rosin substantially free of unsaponifiable and color bodies; while about 20% are withdrawn as liquid from condenser 19 as tall oil distillate containing 25% rosin.

If it is desired to produce product for the emulsion polymerization of butadiene and styrene the fatty acids drawn off line 65 are hydrogenated to preferentially convert the linoleic acids to oleic after which the fatty acids are converted to either a sodium or potash soap to be used as an emulsifier for the emulsion polymerization reaction, this being a rational economic process for a source of low titer soap for low temperature polymerization in the manufacture of rubber. Low titer soaps from other oleic fatty material are so costly as to make their use in the rubber process almost prohibitive.

If it is desired to produce disproportionated rosin in the vapor phase, iodine vapors are fed to the unit at point 70, then during the operation of the apparatus there is produced simultaneously fatty acids to be drawn off through lines 63 and 65, bottom cut of disproportionated rosin to be drawn off line 71, middle cut of disproportionated rosin to be drawn off line 47, and fatty acid-rosin top cut to be drawn off line 67. Disproportionation in the vapor phase is accomplished almost instantaneously, therefore decomposition does not result as in the liquid phase process which takes several hours at the decomposition temperature of the fatty acids and rosin. The disproportionated rosin drawn off at line 47, when made to a soap, is a very satisfactory emulsion soap in the polymerization of butadiene and styrene in the synthetic rubber process. The disproportionated rosin and the hydrogen stabilized fatty acids may be combined in any proportion to be made into soap for emulsion polymerization reaction, therefore making possible a wide range of operating temperature for this reaction thus varying the type of final rubber attainable. Reaction times of 7 hours have been attained by Rubber Reserve Test LM.2.0.3.

When the apparatus is operated to produce refined fatty acids from cottonseed oil refining residue, evaporator 11 and condenser 19 are operated as total condensers no heat being applied to vessel 11, the lower boiling palmitic fraction is taken off at lines 63 and 65 the olefinic fraction high boiling at discharge outlet 47 and residue at discharge outlet 34.

If it is desired to produce methyl esters of fatty acids from tall oil, anhydrous alcohol is fed into the apparatus at points 68 or 69, and otherwise the operation is the same as previously described for fatty acid, rosin separation. The fatty acid-methyl esters are formed in the vapor phase, the rosin resisting esterification. If the methyl alcohol is fed at point 69, the fatty acid esters are withdrawn through line 67 and may be alkali refined by conventional methods to remove final traces of free rosin. Simultaneous production and separation of fatty acids, fatty acid-ester, rosin, and residue may be obtained by feeding alcohol at either points 68 or 69. Feeding alcohol at point 68 produces ester to be drawn off line 63 or 65; feeding alcohol at point 69 produces ester to be drawn off line 67 and fatty acid to be drawn off lines 63 and 65.

As will be apparent from the foregoing, arrangements and techniques in accordance herewith produce quite fine rectification with minimum of heat-induced decomposition, resinification, polymerization, and like wasteful or undesired reactions. In large measure, such advantages are believed to result primarily from the differential evaporation and differential condensation aspects hereof with liquid and vapor flows being countercurrent so that a concentration gradient obtains along the apparatus with regard to both the liquid stream and counter-current vapor flow. Thus, the liquid phase being heated does not reach an equilibrium concentration, as with the usual distillation techniques, and the constant enrichment thereof in its passage through the apparatus permits selective returning to the liquid stream of vapor fractions being condensed at particular points where separation of components therein may most quickly be maximized with a minimum of holdup of heat-sensitive components in the liquid phase.

Additionally, further advantages along these lines are believed to result from the utilization in accordance herewith of relatively thin films of liquid being heated on the heated platens. Thus, especially under high vacuum in apparatus in accordance herewith, there is a pronounced splattering effect as the thin film of liquid is evaporated, resulting in an intense spray or cloud of liquid droplets being constantly thrown directly above the heated surfaces, extending perhaps 8 or 10 inches up into the vapor space. These droplets provide tremendous surface area of liquid, perhaps 1,500 times that of the original film, in intimate contact with vapor thus promoting high rate of thermal diffusion and mass transfer resulting in high efficiency of rectification.

In addition to permitting separation of components of a liquid mixture into fractions at one theoretical plate, delivering the vapor fractions at differential condenser means in accordance herewith provides even further efficiencies in separation and fractionation. Returning or adding such various vapor fractions to an evaporating and moving liquid film, by differential condensation and counter-current flow, further increases rectification as the fractions are re-introduced into the moving and evaporating liquid film at a point in the flow therein where the composition of the liquid film matches the composition of the returning or previously vaporized fraction. Thus is accomplished the differential removal of components from the starting mixture with subsequent separation or rectification of individual components in the evaporated fractions and with dividing a liquid mixture into a plurality of different fractions continuously through the apparatus and then accumulating such divided fractions for further rectification at different points along the system according to the particular composition of each individual fraction.

Whether such accumulating and dividing in accordance herewith is accomplished in a single unit, such as differential evaporator-condenser 10, or in a plurality of the interconnected individual units is a matter which relates primarily to the particular material being treated, the compositions and purity of the particular fractions desired ultimately to be separated, and similar factors. Also, whether divided vapors are withdrawn and condensed through condensers such as 12 or 17 at extreme ends of the apparatus or through other or additional condensing means located at other points along the apparatus are also factors dictated to a large extent by the particular materials being treated and the particular results desired. Partly as a result of the splattering and violent expansion action noted during evaporation from the very thin liquid films and partly, perhaps, as a result of having a high vacuum imposed on the system, evaporated materials have sufficient vapor velocity rising from the heated platen to proceed directly to the nearest condensing surface with a minimum of diffusion with vapors in adjoining increments of the apparatus, and such velocity factors are similarly available to provide for separately directing a flow of the vapors into the nearest available condensing arrangement, whether it be merely the cooled condensing surface 45 or a withdrawing condenser such as 12 or 17. Similarly, whether a separation or alteration in direction of vapor flow be achieved by interrupting condensation at the top of the apparatus (as by insulation 32) or, alternatively, by actually physically interrupting the vapor flow path by providing individual units with continuous liquid flow therebetween, the desired high degree of separation and rectification is still obtained in accordance herewith.

As illustrative particularly of the foregoing, there is indicated in FIGS. 5 and 6 an application of this invention to a tall oil treatment plant utilizing a plurality of more or less modular differential evaporation-condensation or divider and accumulator units for separating tall oil components into a substantial plurality of fractions each of which is further rectified and accumulated to provide ultimately two or three highly concentrated purified resin, fatty acid, and intermediate fractions.

Regarding such a system and the results to be achieved thereby, it may be helpfully noted that the treatment of tall oil in accordance herewith to recover from this essentially waste product commercially useful or valuable purified fractions or components may include separation of the tall oil starting material into the following fractions of commercially useful materials or eliminating undesired contaminants such as (a) a color producing fraction, (b) low boiling unsaponifiable components, (c) palmitic acid components, (d) oleic, linoleic, etc., fatty acid components, (e) rosin components (f) sterol components, and (g) pitch residues.

The question of color, which may be a quite significant one in the commercial marketability of the resulting products, is related to the presence in the raw or crude tall oil of small amounts of materials which tend to undergo thermal decomposition under high vacuum distillation conditions. Preferably this is accommodated prior to the principal fractionation by heating the crude material for some hours under high vacuum and at a temperature just below the boiling range of the fatty acid components (e.g., approximately 225°–300° F. depending upon vacuum), as noted below, which treatment either removes the colorific materials and/or stabilizes or "bodies" the unstable materials to where they are no longer volatile and, hence, produce a minimal contamination in the later rectified useful fractions of rosin or fatty acid materials to be separated.

Thereafter the noted palmitic acid, rosin acid, and olefinic fatty acid fractions are separated from the pitch residues and sterols in a sequence of differential evaporation and differential condensation steps in, preferably, several individual, but serially interconnected units in which are accomplished the various steps of differential evaporation and differential condensation for rectification or separation of a plurality of fractions having different compositions, the accumulation of related fractions, and re-introduction thereof into subsequent rectification steps at various points therealong where the composition of the intermediate fraction is matched to the composition of liquid phase at the particular point of re-introduction. Thus, ultimate rectification is accomplished by differential of simple distillation, by the enhanced intimate contact of vapors with spray from the liquid phase film, by differential or simple condensation, by enhanced intimate contact of vapors with condensate, and by accumulating the various fractions and individual re-introduction thereof at points along the apparatus where the vapors being formed by evaporation from the liquid film are substantially in equilibrium with the particular increment of liquid phase film from which the vapors are derived.

As will be understood, the ultimately desired composition of each particular final fraction may be in large measure controlled or dictated by varying market conditions for a particular material at a particular degree of purity, and the particular composition or purity of any one ultimately separated fraction is readily controlled in accordance with the point in the system at which such fraction is separated completely into a product. Merely as illustrative, from a tall oil crude originally including about 3% palmitic acid, twelve theoretical plates in the various processing stages in accordance herewith (including both differential evaporation steps and differential and rectifying or separating condensations) will produce a palmitic fraction of about 90% purity, which is a recognized article of commerce which can be marketed as such and/or further purified or rectified as may be desired.

Also, instead of accomplishing an entire rectification or separation in a single unit (such as 10 in FIG. 1), it may be preferred to utilize a number of individual units (such as in FIGS. 5 and 6 described below), so that the portion of the liquid material entering the units where most of the rosin and olefinic fatty acid separation occurs will have already substantially been freed of unsaponifiable low boiling light ends and a palmitic fraction of desired purity. Then, a further fraction rich in rosin acids (constituting perhaps about one-third of the original crude feed) may readily be separated to contain perhaps 15% rosin admixed with olefinic fatty acids. Such a mixture may be marketed directly as a distilled low rosin product as commercially recognized, or further rectified for additional separation of rosin and fatty acid components. In any event, after substantially complete removal of palmitic and low boiling light end components, rosin and fatty acid components are evaporated until the acid number of the residue is reduced to 50–100, depending on the original composition of the crude material and the extent of reflux provided to produce the desired commercial products of the desired purity. For example, fourteen theoretical plates (after palmitic and light ends separation) produces separation of rosin and fatty acid fractions of about 98% purity each, and satisfactory results in accordance herewith have achieved a fatty acid final fraction substantially pure, and a 95% finished rosin product of a saleable commercial grade (such as "WG" or "N" rosin). Residues with acid numbers of 50–100 are further rectified producing as a distillate a soft dark rosin material and a final residue with acid number of about 4.

The foregoing operations, then, leave a virtually acid-free pitch for steroid separation in, for example, a molecular still for removal of unpolymerized, non-esterified steroid materials, to be sold as recognized crude steroid material, while the resulting residue is satisfactorily saponified, acidulated, washed, neutralized so that additionally refined steroid materials may be removed in further molecular stripping. Alternatively as will be understood, the pitch at about 50–100 acid number may be sold as such as a recognizable commercial product, and each of the first or second steroid fractions has individual commercial utility.

As additionally illustrative of the application of this invention to such processing of tall oil, one may note the flow sheet FIG. 5, in which are indicated an arrangement of apparatus in accordance herewith and an operative sequence of processing steps. Thus, there is indicated a plurality of divider or differential evaporator-condenser units 101–106, each having one or more dephlegmating condensers and being generally constructed in accordance with the description below pertaining particularly to FIG. 6, and all connected in the desired series or sequence with regard to flow of a liquid phase through all six units. Preposed in the line of flow of treating material is a pretreating unit 107 for dehydrating, deaerating, and thermally decomposing colorific materials in a crude tall oil material from a feed supply thereof indicated at 109.

In the flow sheet diagram of FIG. 5, it is to be understood that the lines of flow of tall oil materials being treated in the system and products produced therefrom are indicated by solid lines, while the vacuum flow arrangement on the system is indicated by double lines, and heating fluid flow to the various indicated elements of the apparatus is indicated by dot-dash lines, with the directions of flow of the respective materials through the respective lines being indicated by arrows thereon.

Although the operation of the entire system diagrammed is to be essentially continuous, it is still desired, as noted above, to hold the crude material to be treated for perhaps about eight hours at a temperature (below the fatty acid boiling range) of about 225°–300° F. and under the very high vacuum (pressures down to 2 mm. mercury or less) for stabilizing the thermal breakdown to be expected of colorific materials, as well as for accomplishing dehydrating and preheating functions previously described for vacuum dryer 61 in the arrangement of FIG. 1. To accomplish this, pretreating unit 107 includes an evacuated spray chamber 110, connected into the vacuum system through line 111, and including a spray head 112 for receiving and spraying or heating and expanding crude tall oil material from inlet 100 therefor, and at the flow rate desired for the throughput of the entire system (e.g., 300 lbs./hr.) for introduction of the material as a spray into evacuated spray chamber 110 and vacuum column 113 depending therefrom. In order, however, to hold material in pretreating unit 107 for as much as eight hours before introducing the pretreated crude tall oil to subsequent units in the system, a recirculation system is provided including a heat exchange column 114 with recirculating pump 115 and recirculating spray head 116 configured and dimensioned for a recirculating throughput capacity of eight times that of spray head 112. Valves 117 and 118 are provided for controlling the flow of material through unit 107 either to be recirculated through heating exchanger 114 or through a parallel heat exchanger 119 from which the liquid feed enters the first differential evaporator-condenser unit 101 through line 120.

As will be understood, a master system is provided for heating the various elements of the diagrammed apparatus with heating fluid, and is generally indicated as a conventional well known "Dowtherm" heating system having a source of heat 125 from or through which heating fluid is circulated through a supply and return manifold arrangement indicated at lines 126 and 127, by pump 128, for supplying various elements of the arrangements as indicated in FIG. 5 by the dot-dash flow lines. A portion of this heating system, as will be apparent is utilized for heating heat exchangers 114 and 119 (as through supply lines 129 and 130 and return lines 131 and 132 for the heating fluid). As will also be understood the various return lines for heating fluids from the various elements of the apparatus are accumulated in a control manifold 135 therefor and flow of heating fluid for the entire system is controlled by the several valves indicated as a group by the numeral 136, with respective flow meters indicated at 137 for controlling all the "Dowtherm" return line flow back to return manifold 127.

As will be apparent from the foregoing, then, tall oil to be treated is introduced at 100 into unit 107 where it is preheated, dried, and held for some 5–8 hours at a high temperature (but below the boiling or thermal decomposition temperature range of the desired useful components later to be separated) and under the high vacuum conditions of the system. From pretreating unit 107, the material to be treated is introduced through line 120 into liquid feed inlet of differential evaporator-condenser divider unit 101, which comprises (as more readily indicated in FIG. 6) a substantially horizontal elongated evaporator-condenser zone or portion (substantially as described in connection with the arrangement of FIGS. 1–4) with a heated platen 140 along which a thin film of liquid flows and from which differential evaporation is secured, and an upper elongated differential condensing surface 141, above heated platen 140, for the differential condensation of materals evaporated from platen 140. At the upstream end of liquid flow through unit 101, there is provided a dephlegmating condenser 145, having a plurality of condensate takeoffs 146 and 147 at various different levels therein for condensate removal as described hereinafter. Platen 140 of unit 101 is heated by circulation of heating fluid from the "Dowtherm" system, as indicated by supply line 148 and return line 149 therein—although such system is omitted for simplicity from FIG. 6 and is to be understood as heating platen 140 in substantially the same manner as previously described in connection with FIG. 2.

Similarly, for economy and simplicity of description and explanation, it may here be noted that each of the additional units 102–106 comprises substantially horizontal and elongated differential evaporation platens (150–154, respectively,) and overlying condensation surfaces (155–159, respectively) and one or more rectifying condensers (160–166, as indicated) positioned thereon at the upstream ends of liquid flow along the respective horizontal platens (except for the additional condensers 162 and 163 in unit 103), with a plurality of condensate takeoffs as noted below in each condenser.

It is to be understood that all the differential evaporation platens 150–154 are heated by a circulation of heating fluid from the "Dowtherm" system, as indicated by the dot-dash flow lines in FIG. 5, although specific reference and explanation of each line is not believed here necessary as being completely apparent from the drawing. It is also to be understood that the several units diagrammed in FIGS. 5 and 6 are constructed generally in accordance with the previous descriptions regarding FIGS. 1–4, and no further reference to the details thereof need here be made. It will also be noted that the head of each of the condensers 145 and 160–166 is connected (as by vacuum lines 170–177, respectively) to main vacuum manifold 178 for maintaining the desired high vacuum on the system, and/or to auxiliary vacuum line 179 maintaining the desired reduced pressure condition in pretreating unit 107.

Also, merely as illustrative and for simplicity of explanation at this time, satisfactory results have been achieved in such an arrangement of apparatus for accommodating a tall oil throughput of about 3000 lbs./hr. with units 101–104 having their respective heated platens about 18 feet long and four feet wide, with the respective horizontal upper condensing surfaces about three feet above the platens. Comparable appropriate dimensions for units 105 and 106 are 30 feet long and four feet wide and three feet high. Similarly, satisfactory results are achieved with dephlegmating condensers 145 and 160 approximately 21 feet high and three feet in diameter, with the several respective condensate takeoffs at appropriate heights as described below to accomplish the purposes intended, and with condensate-entrapping rings around the inside of the condensers and vertically spaced at about 1.5 foot intervals. Similarly the dimensions for condensers 161–163 are 18 feet high and three feet in diameter, with the same ring arrangement; while condenser 164 is appropriately 21 feet high and four feet in diameter, and condensers 165 and 166 are satisfactorily 24 feet high and four feet in diameter, with each including a water jacket 185 and 186 respectively, in known manner and for circulation of coolant through to augment the condensing effect desired, such water jackets being disposed in the upper half of the condenser height, yet below the top thereof.

Again taking up the flow of materials as diagrammed in FIG. 5, two condensate cuts are removed from condenser 145 of divider unit 101 through takeoffs 146 and 147. The lower boiling of these cuts is introduced into condenser 160 of unit 102 at 190, while the higher boiling cut from unit 101 is introduced as liquid feed into the upstream liquid inlet end of unit 102 to form a liquid phase film over heated platen 150 in unit 102. Condensate from condenser 160 is taken off at 192 as comprising, substantially, low boiling and unsaponifiable light ends, which are introduced, along with other overhead low boilers from units 105 and 106 or elsewhere accumulated in overhead manifold 193, into light ends storage tank 194, preferably through a barometric sealing leg 195 and flow control 196, in completely known understood manner.

Liquid effluent from unit 101 exits at the down stream end of liquid flow therethrough at 199 and is introduced into the upstream liquid flow end 200 of unit 103. As will be apparent in the foregoing, whether units 101 and 103 are completely individual or separate is not of critical importance in this connection, provided only that the flow of liquid phase through unit 101 and 103, etc., be continuous, while the flow of vapor is counter-current to the liquid flow in the designated portions of the sequential reaction or rectification steps. As previously noted in connection with FIG. 1, a substantially continuous liquid flow is maintained from left to right in differentially evaporator 10, whereas the counter-current vapor flow therein is made to divide. That is, condensation-preventing insulation at the right hand portion of unit 10 causes vapors to the left of the insulated portion to be drawn (by the vacuum system or other partial pressure conditions) to condenser 17, whereas vapors in the insulated portion take the opposite direction toward condenser 12. Some simplicity of installation and, perhaps, operation may be achieved by arranging individual separate modular units, such as 101 and 103, for containing and controlling the oppositely directed vapor flow, while continuous liquid phase flow is maintained therethrough. As noted, of course, adequate control of direction of vapor flow, etc., may be achieved by thermodynamic or gas law considerations, as well as by actual physical interruption or separation of the vapor phases above the continuous flowing and evaporating liquid film through units 101 and 103.

At this particular point in the sequential separation and rectification of the above noted various components of the tall oil, the primarily desired function for unit 103 is the accumulation of a plurality of fractions of varying compositions. Accordingly, it is primarily the separation or rectification achievable in the several condensers 161–163 of unit 103 (and, additionally, 164 of unit 104) which is here desired. Accordingly, it is preferred to have all the horizontal outer surfaces of unit 103 insulated (or otherwise controlled as to temperature) so as actually to minimize condensation on horizontal surface 156 of components evaporated from heated platen 151 in unit 103, with the result that the evaporated components are condensed in the several condensers 161–163 to form a finite and separable plurality of fractions instead of the infinite composition gradient achievable with continuous differential condensation in the other units with uninsulated or cooled upper horizontal condensing surfaces. Thus, a plurality of takeoffs are provided at various heights in the several condensers 161–163 (and, also, 164 of unit 104) such that a number of intermediate or partially rectified fractions are separated, each with a different composition and having more less of the particular rosin and fatty acid materials desired ultimately to be completely rectified and separated.

In the illustrated embodiment, each of the condensers 161–164 includes two condensate takeoffs (201–208, as indicated in FIG. 6). It is to be noted that since none of the fractions separated at condensate takeoffs 201–208 is (or is intended to be) an ultimate rectification of any particular desired final component of the original mixture, the particular composition of each fraction (or, even, the particular number of individual fractions) is not particularly critical in accordance herewith. The primary result desired is the separation of condensable vapor phases at this point in the process into a substantial plurality of different fractions having different proportions or compositions of the several rosin or fatty acid products particularly desired, and it is not even critical that such fractions are separated in units 103 and 104 at vapor ratio points which maximize the concentration of the particular desired product. The principal point here is to provide a plurality of differently constituted intermediate fractions which can then each be reintroduced into unit 105 at a particular point therealong where the composition of the vapors being evaporated from the liquid phase in unit 105 substantially exactly matches the composition of the separated fraction from unit 103 and 104 being reintroduced at that point. Thus, the enhanced rectification efficiency or fidelity achieved in accordance herewith by the combined accumulating-separating results or steps of units 103, 104, and 105 are believed to be produced more by the second stage rectification of a plurality of cuts introduced into the liquid-vapor system in unit 105 at the precisely proper point, rather more than such advantages relate in any manner to the fineness or efficiency of a particular separation or rectification in units 103 and 104.

Thus, the several separated fractions 202–208 from the condensers 161–164 of units 103 and 104 are introduced into the elongated horizontal differential condensation and evaporation of unit 105 as through the top differential condensation surface 158 thereof at the various different or horizontally spaced points as noted in FIG. 6 whereby each of the condensate cuts from units 103 and 104 is introduced into the unit 105 at the particular point therealong where the composition of the cut matches the vapor phase atmosphere at that point along unit 105 where each of the cuts 202–208 is introduced. The lowest boiling cut 201, as indicated in FIG. 6, may preferably be introduced into condenser 165 of unit 105, rather than into the evaporation zone thereof.

Similarly, as will be understood, there is continuous liquid phase flow between units 103 and 104, with the liquid effluent from unit 103 being conducted, as by line 210, to the upstream liquid flow inlet of unit 104. As previously discussed with regard to units 101 and 103, the provision of separate units 103 and 104 is primarily a matter of convenience as compared with the appropriately alternative arrangement of interrupting vapor flow by a variety of means while liquid phase flow is maintained continuously all through units 101, 103, and 104.

Regarding liquid flow through units 101–104, the evaporation separation (although, perhaps, not complete rectification) of vaporizable components from the original liquid crude will have been completed in unit 104, so that the liquid effluent therefrom, exiting at the downstream end thereof through line 215, may be considered as the pitch residue referred to above, whether or not this pitch residue may be further separated or refined or treated to produce sterol fractions, etc., and, is indicated as flowing into pitch tank 216, preferably through barometric sealing leg 217 and valving and flow regulating apparatus indicated generally at 218. Similarly, the liquid effluent from 102 (in which the final separation or rectification of light end fractions was obttined), as directed from the downstream end of unit 102 into the upstream liquid phase flow along unit 105 through line 220 to provide a portion of the liquid phase film in unit 105 for differential evaporation therein at various points therealong and at various vapor compositions into which are introduced the matching condensate cuts 202–208. The liquid effluent from unit 105 is the desired ultimate rosin cut, exiting from the downstream end of unit 105 through line 225 into rosin tank 226, with, preferably, barometric sealing leg 227 and flow regulating or recording apparatus 228. There is, additional rectification and separation of what may be considered essentially a binary mixture of fatty acid components and rosin acid components introduced to unit 105 from a variety of different points in the process is substantially achieved therein, with a condensable cut rich in fatty acids being withdrawn from condenser 165 of unit 105, as through condensate takeoff line 230, and a further light ends fraction being withdrawn overhead from condenser 165 through line 231, to be combined with other light end fractions in accumulating manifold 193.

Depending on the desired ultimate rectification (as noted above regarding fatty acid components or fractions rich therein), the fraction withdrawn from condenser 165 or unit 105 through line 230 may be further separated, rectified, or purified by reintroduction into unit 106 as, for example, by being introduced to condenser 166 thereof to form refluxing and condensable fractions to provide a further liquid phase film, along heated platen 154 of unit 106 and flowing downstream therein from the position of condenser 166 thereon, to form a further liquid effluent rosin containing fraction and collected in tank 235 through line 236 from the downstream end of unit 106, and with the aforementioned preferred arrangement of barometric sealing leg 237 and flow apparatus 238. Also as desired and indicated as optional by the dotted outline, additional reactants such as phthalic anhydride and/or maleic anhydride, etc., may be introduced into the horizontal differential evaporator and condenser portion of unit 106 for reaction therein in anhydrous vapor phase with the components in unit 106 to provide, in accordance herewith, a further enhancement of the final product as by forming adducts which aid in further separation of the various components and/or enhance the acid number, react with phenols in the system, etc., as described below.

The desired ultimate fraction rich in fatty acids is separated from condenser 166 in unit 106 at an appropriate point therealong as indicated by line 240, and conducted thereby to fatty acid tank 241, again through barometric seal 242 and flow mechanism 243. An overhead cut of light ends is also removed, if necessary, from the top of condenser 166 as through line 245, and accumulated with other light end cuts in manifold 193. Simply to complete the description of FIG. 5, a drip line 250 is preferably provided to accumulate condensate from the vacuum system manifold 178 and conduct such drips to tank 251, through barometric leg 252 and flow control 253.

Merely as further illustrative of an example of commercial operating techniques in accordance herewith and utilizing the arrangement of apparatus as described above, one may note rectification and fractionation generally as follows, utilizing a commercial tall oil material at throughput rates of about 3000 lbs./hr. Thus, the tall oil raw material (after having been subjected to the pretreatment in unit 107 of holding for about 8 hours under high vacuum and at 325° F. for stabilizing color, etc., as noted) may be considered as containing (in parts by weight) about 1560 parts rosin, 801 parts fatty acids, 90 parts light ends, 120 parts palmitic fraction, and 429 parts pitch, as the pretreated material was fed into unit 101 through feed line 120. At the indicated treatment rate of 3000 lbs./hr., there resulted in unit 101 a liquid effluent through line 199 ant feeding into dividing unit 103 a mixture including about 1380 parts rosin, 441 parts fatty acids, and 429 parts pitch; while the vapor mixture entering condenser 145 of unit 101 comprised about 180 parts rosin, 360 parts fatty acids, 90 parts light ends, and 120 parts palmitic fraction.

These vapors were condensed in condenser 145 to yield, at take-off 146, a mixture of 155 parts rosin, 193 parts fatty acids, 65 parts light ends, and 87 parts palmitic fraction; while there was removed at take-off 147 a mixture comprising 25 parts rosin, 167 parts fatty acids, 25 parts light ends, and 33 parts palmitic fraction. The latter fractions were introduced into unit 102, as indicated, where they were further separated into a light ends fraction at take-off 192 comprising 6 parts rosin, 84 parts fatty acids, 90 parts light ends, and 120 parts palmitic fraction (which mixture indicated and acid number of 145); while the liquid effluent from unit 102 (conducted through line 220 to unit 105) comprised about 174 parts rosin and 276 parts fatty acids.

The mixture of rosin, fatty acids, and pitch entering the liquid inlet 200 of unit 103 was separated therein into six condensed fractions and a liquid effluent. Thus, as the liquid proceeded along heated platten 151 of unit 103, the vapor mixture entering condensers 161–163 were as follows: entering condenser 161, rosin 135 parts and fatty acids 165 parts; entering condenser 162, rosin 216 parts and fatty acids 84 parts; and entering condenser 163, rosin 231 parts and fatty acids 69 parts. The condensate compositions separated and removed at the various condensate take-offs 201–206 were as follows; at 201, rosin 30 parts and fatty acids 70 parts; at 202, rosin 55 parts and fatty acids 45 parts; at 203, rosin 63 parts and fatty acids 37 parts; at 204, rosin 105 parts and fatty acids 95 parts; at 205, rosin 151 parts and fatty acids 39 parts; and at 206, rosin 168 parts and fatty acids 32 parts. The liquid effluent from unit 103 entering the liquid feed inlet of unit 104 through line 210 comprised about 798 parts rosin, 123 parts fatty acids, and 429 parts pitch.

The differential evaporation and condensation treatment in unit 104 resulted in a vapor mixture entering condenser 164 having approximately 777 parts rosin and 123 parts fatty acids, while 450 parts pitch (at an acid number of about 10) was withdrawn through liquid outlet 215 from unit 104. The condensate mixtures removed from condenser 164 included, at take-off 207, about 108 parts rosin and 42 parts fatty acids, and, at take-off 208, about 669 parts rosin and 81 parts fatty acids. As noted, the foregoing condensed vapor fractions 201–208 from units 103 and 104, along with the liquid effluent from unit 102, were introduced at the various points indicated along accumulator unit 105, to produce a liquid rosin acids fraction at outlet 225 of unit 105 comprising about 1401 parts rosin and esters, 29 parts fatty acids, and 20 parts unsaponified components; while the fatty acids fraction condensate removed from condenser 165 at take-off 230 comprised about 716 parts fatty acids, 80 parts rosin acids, and 4 parts unsaponified components.

As illustrating particular considerations for determining in accordance herewith the exact placement of the inlets for fractions 201–208 into accumulator unit 105, it may be recalled that it is desired for each of these fractions to enter the differential evaporator-condenser portion or phase of unit 105 at a point therealong where the particular entering composition is substantially the same as the liquid phase at that point along unit 105, and particularly with regard to the rosin content of the various entering fractions. From the foregoing explanation, it will be noted that the condensate from take-off 201 has the least rosin content (about 30%) and is, thus, introduced directly into condenser 165 along with the vapor mixture produced in differential evaporator 153 of unit 105 (for example, at about 3 ft. above the horizontal condensing surface 158). The liquid effluent from unit 102 entering unit 105 through line 220 contains about 38.7% rosin, and is, thus, introduced as indicated for virtually immediate evaporation into condenser 165.

The rosin proportions of the remaining condensate feeds 202–208 are, as noted above, approximately and in ascending order: 52.5% for 204, 55.0% for 202, 63.0% for 203, 72.0% for 207, 80.0% for 205, 84.0% for 206, and 89.0% for 208. Accordingly these several compositions are introduced along horizontal evaporator condenser 158, 153 of unit 105 in the foregoing order, reading from condenser 165 toward the opposite end of unit 105, and considering the horizontal extent of the unit as being approximately 30 ft. satisfactory (although merely illustrative) spacings for the several inlets therealong may be noted as introducing line 204 at about 7 ft. from condenser 165, inlet 208 about 11 ft. from the opposite end of unit 205, and with the remaining lines spaced therebetween as indicated by the rosin contents thereof. Thus, 2 ft. spacing is satisfactory between units 206–208, 205–206, and 202–204, while about 4 ft. is preferred between 202 and 203, and only about a foot between 203–207 and 205–207.

In the fatty acid purification unit 106, the above noted fatty acid fraction from condensate take-off 230 of unit 105 (and containing about 89.5% fatty acids) was introduced into condenser 166 of unit 106, while, preferrably, a reactant comprising about 80% maleic anhydride and 20% phthalic anhydride was introduced at line 238 for reaction therein. The final separation of a fatty acid fraction taken off at line 240 included virtually all the fatty acids at purity of 99.9%, while a liquid rosin-containing fraction was removed at liquid outlet 236 comprising about 84 parts of material including 05.6% fortified rosin acids and the remainder unsaponified materials and esters.

As will be apparent from the foregoing, and as well understood in this art, there are a variety of ultimate products (each of which, of course, being essentially a mixture) to be produced from tall oil in accordance herewith, depending upon particular conditions of operation, additives, etc. For this reason, the particular designations of the product fractions as used herein are not meant to be limiting. Thus, as generally and currently understood in the trade regarding tall oil, there are a number of well recognized categories or designations of various ultimate product fractions obtainable from distillation of tall oil. For example, "tall oil rosin" is generally considered, an a commercial grade or product, a mixture of rosin which includes not more than about 5% fatty acids, while "tall oil fatty acids" may generally be considered as a commercial product mixture of olefinic fatty acids including not more than about 5% rosin, and the designation "distilled tall oil" generally refers to a third product from tall oil distillation including a mixture of olefinic fatty acids and rosin having more than 5% rosin but otherwise being predominantly fatty acids.

Thus, in a manner of speaking, the "rosin" (or "rosin acids") fraction is commercially useable as a source of rosin in applications where fatty acid contamination of no more than 5% is not objectionable, while the "fatty acid" product is similarly useable as a source of olefinic fatty acids in applications where contamination by heavier rosins of no more than 5% is not objectionable. The third or "intermediate" fraction also has its own commercial application in situations where relatively pure fatty acids or relatively pure rosin are not required. It will be general considerations of commercial economics which determine how much effort or expense is warranted to minimize the production of (or, indeed, further rectify or separate) such third distilled product, which is, in reality, a mixture which has too much rosin to be "fatty acid" and too much fatty acids to be considered "rosin."

It is such a third product which is removed from the liquid exit of unit 106 at line 236. Whether such product meets the specifications for "distilled oil" or "fortified rosin," etc., depends upon the composition of the mixture at that point, and, thus primarily, upon the operation of units 105 and 106 and, particularly, upon the utilization of a reactant in unit 106 through line 238. Thus, under certain market conditions or operating goals, one may sell the intermediate fraction distillate taken off at line 230 of unit 105 as "intermediate fatty acid" or "distilled tall oil," and sell the liquid effluent from unit 105 as commercial "rosin." Alternatively as indicated, a further rectification of such fatty acid mixture is obtained in unit 106 with a purer fatty acid product available at take-off 240 and a third product, of commercial value as a liquid effluent through line 236.

As noted, the particular compositions of these products from unit 106 may be altered in a variety of significant ways, one of which was noted above as by utilizing a reactant. That is, material such as phthalic anhydride, phthalic acid, or other materials which react with phenolic components in the mixture will enhance the ultimate color characteristics of the fatty acid materials withdrawn through line 240 (many of which colorific materials are phenolic and within the boiling range of the fatty acids) by forming therewith higher boiling products which are, thus, removed from the "fatty acid" fraction withdrawn through line 240. Similarly, maleic anhydride, maleic acid, and similar well known reactants having a reactive double bond in a similar structure, readily react in anhydrous vapor phase in unit 106 to produce higher boiling materials from components therein, thereby further purifying the fatty acid content of distillate withdrawn through line 240.

To the extent that the products of such reactions in unit 106 produce heavier or higher boiling products to be included in the liquid effluent through line 236, they not only increase the purity of the fatty acid distillate, but they also increase the heavier (or, at least, nonfatty acid) content of the liquid effluent to produce, if desired, a commercial product known as "fortified rosin" from line 236 having enhanced commercial value for some applications. As also will be understood from the foregoing, and of a variety of other known chemical reactions with the various components of material introduced into unit 106 are readily and sufficiently accomplished therein in anhydrous vapor phase form for further altering the particular composition of the two ultimate products finally separated at unit 106, either of which, of course, can be further rectified or separated in subsequent steps if desired and in known manner.

As also will be understood from the foregoing, the various illustrative dimensions and arrangements herein disclosed relate to the tall oil distillation example and are not to be understood as being either limiting or of universal application to all organic liquid mixtures with which satisfactory results are achieved in accordance with this invention. More broadly, for example, the throughput capacity of the entire system is primarily limited by the ability of the first units to remove with substantial completeness whatever light ends and unsaponifiable materials are in the initial feed. Thereafter, the length and width of the various units in any specific installation are readily determined in accordance herewith, and of course, with well recognized considerations and this art. For example, in any given L-shaped unit, the width is primarily important (in addition, of course, to the structural considerations in building a unit in the preferred cross-sectional shape of FIG. 2) to assure sufficient heating area to vaporize all components which it is desired to vaporize in that unit, while the length of each individual unit is more related to the differential evaporation and differential condensation required to produce at least one pure component from polynary mixture feeds.

Generally, such width dimensions can very all the way from 1–8 feet, although, for a variety of reasons, 4–6 feet is preferred. Similarly, with these mixtures of closely boiling materials, a length of 18–20 feet (of apparatus as disclosed) is generally to be considered necessary for removing one pure component in each unit, although longer or shorter units may be utilized as conditions permit. Considering a divider unit such as 103, the principal design criteria revolve around the question of making the unit long enough to get all vaporizable components therein adequately vaporized, and of providing sufficient condensers (or condenser take-offs) to obtain as many fractions as desired. Indeed, since vaporization and division of vapor fractions is primarily desired with unit 103 (instead of continuous differential condensation along horizontal surfaces therein), it may be preferred to insulate the upper horizontal portions of the unit to prevent condensation therein as is desired in the other units.

Also, the actual temperature conditions maintained, particularly at the heated plattens, may vary over wide ranges. Considering the various tall oil components of the illustrative example, the olefinic fatty acid fractions may be considered as having boiling ranges about the 375° F. level, under these vacuum conditions, while rosin boils around approximately 400° F. Under such circumstances, temperature ranges are in about the ranges of 400°–600° F., and preferably 510°–530° F., produce satisfactory results, provided sufficient condensing surface of the unit is available. As will be understood, of course, the rate of heat input (and/or the temperature difference between the heated platten itself and the boiling point of the various liquid mixtures being evaporated thereagainst) may have an important effect on the rate of vaporization (and, perhaps, the splattering effect noted above), but satisfactory operating results have been achieved in tall oil applications with the type of apparatus disclosed primarily in the above noted temperature ranges.

As will be understood from the foregoing, the enhanced rectification and separation in accordance herewith may in large measure be attributable to the conditions of partial vaporization and partial condensation, as well as the maintainance of concentration gradients along the various horizontal condensing surfaces and/or in the horizontally flowing vapors. At the same time, even at extremely high vacuums, the disclosed arrangement maintains such concentration gradients in the vapor flows and without undesired diffusion or mixing of the vapor stream traveling horizontally, while also maintaining favorable interphase transfer rates normal to the condensing surface. Although the illustrative embodiment is indicated as operating at high vacuum, enhanced results are also achieved at higher pressures, perhaps primarily because of the contribution of interphase mass transfer to the overall effect. In any case, the partial vaporization and partial condensation in accordance herewith provide continued enrichment of the respective phases, whether at extremely high vacuum or, even, at atmospheric or higher pressures, as the vapor flow occurs parallel to the liquid flow and normal to the direction of evaporation from liquid to vapor phase.

While the methods and forms of apparatus herein described represent preferred embodiments of this invention, this invention is not limited to these precise methods and forms of apparatus and changes may be made therein without departing from the scope of this invention which is defined in the appended claims.

What is claimed is:

1. In a process for the continuous fractional distillation and separation of a liquid mixture of organic materials having different but closely associated boiling ranges, the steps which comprise continuously flowing said liquid mixture through an elongated horizontal evaporation zone, continuously heating said liquid flowing through said evaporation zone to effect differential vaporization of vaporizable components thereof at successive points along said evaporation zone, thereby forming a continuous stream of vapors, continuously flowing said vapors through an elongated unimpeded horizontal condensation zone above and substantially parallel to said evaporation zone and effecting differential condensation of components in said vapors at successive points along said condensation zone, said vapor flow being countercurrent to said liquid flow, said continuous evaporation and condensation being such that vapors formed on said evaporation zone rise upwardly toward said condensing zone while flowing upstream and are condensed in said zone upstream of the points at which they were vaporized, said condensed components falling downwardly toward said evaporation zone at points upstream of their previous evaporation points where said components are again vaporized, rise upwardly toward said condensing zone while flowing upstream and are again condensed upstream of the points at which they were vaporized, said vapor flow from said evaporation zone to said condensation zone being inclined with respect to said horizontal evaporation zone, said procedure of evaporation and condensation being continuously repeated so as to form a progressive concentration gradient in said vapors flowing upstream and in said liquid flowing downstream, said vapors becoming progressively enriched as they are formed upstream in said evaporation zone, said liquid residue becoming progressively enriched as it is formed downstream in said condensation zone, continuously withdrawing vapors from said condensation zone upstream of said liquid flow to yield a fraction rich in lower boiling components, and continuously withdrawing from said evaporation zone at the downstream end thereof unvaporized liquid residues of said liquid mixtures.

2. In a process for the continuous vacuum fractional distillation and separation of a liquid mixture of organic materials having different but closely associated boiling point ranges and being readily susceptible to resinification and decomposition upon heating, the steps which comprise continuously flowing said liquid mixture through an elongated horizontal evaporation zone, continuously heating said liquid flowing through said evaporation zone effecting successive evaporation of vaporizable components thereof at successive points along said evaporation zone forming a plurality of streams of vapors, continuously flowing a portion of said streams of vapors through an elongated horizontal condensation zone above and substantially parallel to said evaporation zone and longitudinally coextensive with a portion only thereof upstream with respect to said liquid flow, said vapor flow being countercurrent to said liquid flow and effecting successive condensation of components in said vapors at successive points along said condensation zone, returning said condensed components from said condensation zone to said evaporation zone at points therealong upstream of points at which said condensed components were vaporized, continuously flowing the remainder of said vapors through an elongated horizontal vapor zone above and substantially parallel to the remaining downstream portion of the said evaporation zone and in the same direction as said liquid flow therethrough, continuously withdrawing from said condensation zone at the end thereof upstream of said liquid flow through said evaporation zone vapors rich in lower boiling components of said liquid mixture and condensing said vapors to yield a fraction rich in said lower boiling components, continuously withdrawing from said vapor zone at the end thereof downstream of said liquid flow through said evaporation zone vapors rich in higher boiling components of said liquid mixture and differentially condensing said vapors into different fractions rich in said higher boiling components, introducing at least a portion of said higher boiling fractions into a second elongated horizontal evaporation zone for successive vaporizable components forming another substantially continuous stream of vapors, continuously flowing said stream of vapors through a second horizontal condensation zone above and substantially parallel to said second evaporation zone and countercurrent to liquid flow therethrough effecting successive condensation of components in said vapors, continuously withdrawing from said second condensation zone at the end thereof upstream of said liquid flow through said second evaporation zone vapors rich in lower boiling components introduced into said second zones and condensing said withdrawn vaporizers to yield a fraction rich in said lower boiling components, continuously withdrawing from the downstream end of said second evaporation zone unvaporized liquid components introduced thereinto, withdrawing from the downstream end of said first evaporation zone unvaporized liquid residues of said liquid mixtures introduced thereto, and maintaining all said zones under high vacuum throughout all said evaporating and condensing and withdrawing steps.

3. In a process for the continuous vacuum fractional distillation and separation of a liquid mixture of organic materials having different but closely associated boiling point ranges and being readily susceptible to resinification and decomposition upon heating, the steps which comprise continuously flowing said liquid mixture through an elongated horizontal evaporation zone, continuously heating said liquid flowing through said evaporation zone effecting successive differential vaporization of vaporizable components thereof at successive points along said evaporation zone continuously flowing said vapors through an elongated horizontal condensation zone above and substantially parallel to said evaporation zone effecting successive differential condensation of components in said vapors at successive points along said condensation zone and maintaining a substantial and continuous concentration of gradient in said vapors along said zone as said vapors flow therethrough, said vapor flow through said condensation zone being countercurrent to said liquid flow through said evaporation zone, said continuous evaporation and condensation being such that vapors formed on said evaporation zone rise upwardly toward said condensing zone while flowing upstream and are condensed in said zone upstream of the points at which they were vaporized, said condensed components falling downwardly toward said evaporation zone at points upstream of their previous evaporation points where said components are again vaporized, rise upwardly toward said condensing zone while flowing upstream and are again condensed upstream of the points at which they were vaporized, said vapor flow from said evaporation zone to said condensation zone being inclined with respect to said horizontal evaporation zone, said procedure of evaporation and condensation being continuously repeated so as to form a progressive concentration gradient in said vapors flowing upstream and in said liquid flowing downstream, said vapors becoming progressively enriched as they are formed upstream in said evaporation zone, said liquid residue becoming progressively enriched as it is formed downstream in said condensation zone, continuously withdrawing from said condensation zone at a point therein upstream of said liquid flow through said evaporation zone vapors rich in lower boiling components of said liquid mixture and condensing said vapors to yield fractions rich in said lower boiling components, continuously withdrawing from said evaporation zone at the downstream end thereof unvaporized liquid components of said liquid mixture, and maintaining all said zones under high vacuum throughout all said evaporating and condensing and withdrawing steps.

4. A modular evaporation and condensation unit for assembly in a system of the character described for the continuous fractional distillation and rectification of a liquid mixture of organic materials having different but closely associated boiling ranges, which comprises in combination an elongated and substantially horizontally disposed enclosed evaporating and condensing vessel having a flat and substantially smooth and level bottom, liquid inlet means for continuously introducing a liquid mixture into said vessel for flowing therethrough along said bottom thereof, means for heating said liquid on the bottom of said vessel effecting successive vaporization of components in said mixture at successive points along said vessel, means in said vessel forming a continuous and substantially smooth and level condensing surface above and substantially parallel to said liquid flow therethrough for successive condensation of components in said mixture vaporized by said heating at successive points along said condensing surface, the interior of said vessel being substantially unobstructed for unimpeded horizontal and longitudinal flow of said liquid and said liquid and said vaporized components therethrough and for return of said condensed components from said condensing surface to said liquid flow, vapor outlet means in said vessel upstream of said liquid flow therethrough for withdrawing vaporized and uncondensed components therefrom, liquid outlet means in said vessel downstream of said liquid flow therethrough for withdrawing therefrom unvaporized components of said liquid mixture, and condenser means in flow communication with said vapor outlet for condensing vapors withdrawn from said vessel through said outlet.

5. Modular apparatus as recited in claim 4 in which said condenser means includes means for fractionally condensing vapors withdrawn from said vessel through said outlet into a plurality of condensed fractions having different compositions and means for separately withdrawing each of said condensed fractions from said condenser means.

6. In an arrangement of apparatus of the character described for the continuous multi-stage fractional distillation and rectification of a liquid mixture of organic materials having different but closely associated boiling ranges, the combination which comprises a plurality of individual modular units, each of said units including an elongated substantially horizontal vessel having a substantially flat bottom and a horizontal condensing surface spaced above and parallel to said flat bottom for differential evaporation and condensation of liquid components of said mixture and means for condensing and separately withdrawing from said vessel a plurality of different fractions of components vaporized therein, means for heating said flat bottom of each of said vessels effecting said differential evaporation of liquid therein, means for cooling said condensing means in each of said vessels effecting said condensing and separation of vaporized components therein, means for adjusting and controlling said heating and cooling means individually and selectively for each of said modular units effecting evaporation and condensation in each said unit of different fractions having different compositions of materials in said liquid mixture, first conduit means for interconnecting said plurality of modular units in predetermined sequence for flow of unvaporized materials in said liquid mixture through said differential evaporation vessels for vaporization of different fractions of materials in said mixture in different ones of said vessels, second conduit means for interconnecting said condenser means of some of said units with said differential evaporation vessels of others of said units in a predetermined sequence for evaporation in one of said units of a liquid fraction of said mixture condensed by said condensing means on other of said units, each of said second conduit means conducting a condensed fraction of a predetermined composition from one of said units to another in which evaporation of the particular components in said predetermined fraction is effected.

7. In a process for the continuous vacuum fractional distillation and separation of tall oil into fractions respectively rich in fatty acids and in rosin acids having closely associated boiling point ranges and being readily susceptible to resinification and decomposition upon heating, the steps which comprise continuously flowing liquid tall oil through an elongated horizontal evaporation zone, continuously heating said tall oil flowing through said evaporation zone effecting successive vaporization of components thereof at successive points along said evaporation zone forming vapors, continuously flowing said vapors through an elongated horizontal condensation zone above and substantially parallel to said evaporation zone effecting successive condensation of components in said vapors at successive points along said condensation zone as said vapors flow therethrough, said vapor flow being countercurrent to said liquid flow of said oil through said evaporation zone, said continuous evaporation and condensation being such that vapors formed on said evaporation zone rise upwardly toward said condensing zone while flowing upstream and are condensed in said zone upstream of the points at which they were vaporized, said condensed components falling downwardly toward said evaporation zone at points upstream of their previous evaporation points where said components are again vaporized, rise upwardly toward said condensing zone while flowing upstream and are again condensed upstream of the points at which they were vaporized, said vapor flow from said evaporation zone to said condensation zone being inclined with respect to said horizontal evaporation zone, said procedure of evaporation and condensation being continuously repeated so as to form a progressive concentration gradient in said vapors flowing upstream and in said liquid flowing downstream, said vapors becoming progressively enriched as they are formed upstream in said evaporation zone, said liquid residue becoming progressively enriched as it is formed downstream in said condensation zone, continuously withdrawing from said condensation zone at the end thereof upstream of said liquid flow through said evaporation zone vapors rich in fatty acids and condensing said vapors to yield said fatty acids, continuously withdrawing from said condensation zone at the end thereof downstream of said liquid flow through said evaporation zone vapors rich in rosin acids and condensing said vapors to yield rosin acids, continuously withdrawing from said evaporation zone at the downstream end thereof unvaporized liquid residues of said tall oil, and maintaining all said zones under high vacuum throughout said evaporating and condensing and withdrawing steps.

8. A process as recited in claim 7 in which said vapors rich in rosin acids withdrawn from said condensation zone at the end thereof downstream of said liquid flow through said evaporation zone are subjected prior to condensation to a second vacuum fractional distillation state comprising the steps of continuously flowing said vapors through a second elongated horizontal condensation zone effecting successive condensation of components in said vapors at successive points along said second condensation zone, continuously flowing said condensed components from said second condensation zone as a liquid through a second elongated horizontal evaporation zone below and substantially parallel to said second condensation zone, heating said liquid flowing through said second evaporation zone effecting additional successive evaporation of components thereof at successive points along said second evaporation zone, said vapor flow through said second condensation zone being countercurrent to said liquid flow through said second evaporation zone, re-condensing in said second condensation zone components vaporized in said second evaporation zone for return thereto at points upstream of the points at which said re-condensing components were vaporized therein, continuously withdrawing separated higher boiling rosin acids as a liquid from the downstream end of said second evaporation zone; continuously withdrawing lower boiling rosin acid vapors from said second condensation zone at a point adjacent the upstream end of said second evaporation zone and condensing said withdrawn vapors, and maintaining all said zones in said second vacuum fractional distillation stage under high vacuum.

9. In apparatus for the continuous vacuum fractional distillation and rectification of a liquid mixture, the combination which comprises an elongated horizontally disposed enclosed evaporating and condensing vessel, liquid inlet means for continuously introducing said liquid mixture into said vessel for flowing therethrough along the bottom thereof, means for heating said liquid in said vessel effecting successive vaporization of components thereof at successive points along said vessel, means in said vessel forming a condensing surface above said liquid flow therethrough for successive condensation of components vaporized by said heating at successive points along said condensing surface, the interior of said vessel being substantially unobstructed for unimpeded horizontal flow of said liquid and said vaporized components and for return of said condensed components from said condensing surface to said liquid flow, first vapor outlet means at the end of said vessel upstream of said liquid flow for withdrawing therefrom vapors rich in lower boiling components, first reflux condenser means in flow communication with said first vapor outlet for condensing said lower boiling vapors for recovery and refluxing of components thereof, second vapor outlet means at the opposite end of said vessel for withdrawing therefrom vapors rich in higher boiling components, second reflux condenser means in flow communication with said second vapor outlet for condensing said higher boiling vapors for recovery and refluxing of components thereof, liquid outlet means adjacent the downstream end of said vessel for withdrawing therefrom unvaporized liquid residues, and evacuation means connected to said vessel through said first vapor outlet and said first condenser means for maintaining a high vacuum in said apparatus, said first vapor outlet and said condensing surface in said vessel being disposed with respect to said liquid inlet therein effecting flow of vapors vaporized by said heating means in a direction countercurrent to said liquid flow through said vessel.

10. Apparatus as recited in claim 9 in which said first reflux condenser means communicating with said first vapor outlet from said vessel includes fractional condensing means for separating said lower boiling vapors withdrawn through first vapor outlet into a plurality of separate liquid fractions.

11. The method of separating a multiple mixture of organic materials having closely related boiling points to provide at least one high purity fraction, which comprises, continuously flowing said liquid mixture through an elongated horizontal evaporation zone, continuously heating said liquid flowing through said evaporation zone to effect differential evaporation of vaporizable components thereof at successive points along said evaporation zone thereby providing a continuous stream of vapors having a differential concentration gradient along said zone, continuously withdrawing from said evaporation zone at a downstream portion thereof unvaporized liquid residues of said liquid mixture, withdrawing portions of said vapors from a plurality of longitudinally spaced apart points along said evaporation zone to provide a plurality of vapor fractions having different concentrations of higher and lower boiling components, condensing said vapor fractions, separately introducing said condensed vapor fractions in longitudinally spaced apart relationship into a second elongated horizontal evaporation zone, continuously flowing said condensed vapor fractions along said second evaporation zone, continuously heating said flowing condensed vapor fractions to effect differential evaporation of components thereof at successive points along said second evaporation zone to form a substantially continuous second stream of vapors, continuously flowing said second stream of vapors through second elongated horizontal condensation zone above and substantially parallel to said second evaporation zone, effecting successive condensation of components in said second stream of vapors at successive points along said second condensation zone as said vapors flow therethrough, said second stream of vapor flow being countercurrent to said flow through said second evaporation zone, returning said condensed components from said second condensation zone to said second evaporation zone at points upstream of the points at which said condensed components were vaporized, continuously withdrawing from said second condensation zone vapors rich in lower boiling components, and continuously withdrawing from said second evaporation zone unvaporized residues rich in higher boiling components.

12. A continuous vacuum fractional distillation and separation process as recited in claim 2 in which said vapors withdrawn from said first condensation zone are withdrawn at a plurality of different points therealong and separately condensed to form a plurality of different fractions having different compositions, and in which said plurality of different fractions are separately introduced into said second evaporation zone at a plurality of different points therealong.

13. An arrangement of apparatus as recited in claim 6 which also includes a separating condenser unit having a plurality of condensing means for condensing a substantial plurality of differently composed fractions from condensable materials in said liquid mixture, said separating unit being disposed in said arrangement of apparatus for receiving liquid flow from one of said modular units for separating said different fractions from said liquid flow, and which arrangement also includes another of said modular units disposed in said arrangement as an accumulating unit, with portions of said second conduit means arranged to conduct said plurality of fractions separated by said separating unit into said accumulating unit and each at a different point along said differential evaporation vessel thereof for introducing said different fractions from said separating unit individually into said accumulating unit at a predetermined point therein where the composition of each said introduced fraction substantially matches the composition of liquid flow being evaporated in said accumulating unit at that particular point thereof.

References Cited

UNITED STATES PATENTS

| | | | |
|---|---|---|---|
| 2,446,997 | 8/1948 | Brewer et al. | 203—77 |
| 2,614,973 | 10/1952 | Burrows | 202—205 |
| 2,724,709 | 11/1955 | Spence | 260—97.6 |

WILBUR L. BASCOMB, Jr., Primary Examiner

U.S. Cl. X.R.

202—154, 158, 160, 186, 198, 205, 236; 203—1, 80, 87, 89, 91; 260—97.6, 410.9